(12) United States Patent
Choi et al.

(10) Patent No.: US 9,947,291 B2
(45) Date of Patent: Apr. 17, 2018

(54) SYSTEM AND METHOD FOR MULTI-COMPUTER CONTROL

(71) Applicant: Electronics and Telecommunications Research Institute, Daejeon-si (KR)

(72) Inventors: Yong Seok Choi, Daejeon-si (KR); Hyuk Je Kwon, Daejeon-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 282 days.

(21) Appl. No.: 14/994,454

(22) Filed: Jan. 13, 2016

(65) Prior Publication Data

US 2016/0203788 A1 Jul. 14, 2016

(30) Foreign Application Priority Data

Jan. 13, 2015 (KR) .......................... 10-2015-0006406

(51) Int. Cl.
*G06F 15/173* (2006.01)
*G09G 5/00* (2006.01)
(Continued)

(52) U.S. Cl.
CPC ............. *G09G 5/006* (2013.01); *G06F 13/36* (2013.01); *G06F 13/4081* (2013.01); *G09G 2370/022* (2013.01); *G09G 2370/10* (2013.01); *G09G 2370/20* (2013.01); *G09G 2370/24* (2013.01); *Y02B 60/1228* (2013.01); *Y02B 60/1235* (2013.01)

(58) Field of Classification Search
USPC ....... 709/203, 206, 217, 219, 223, 224, 226, 709/228, 231, 232, 238; 705/26.81
See application file for complete search history.

(56) References Cited

U.S. PATENT DOCUMENTS 7,424,551 B2 9/2008 Odyrna et al.
9,537,925 B2 * 1/2017 Williamson ............ H04L 67/02
(Continued)

FOREIGN PATENT DOCUMENTS

KR 10-2007-0079830 A 8/2007
KR 10-2013-0032474 A 4/2013

*Primary Examiner* — Quang N Nguyen
(74) *Attorney, Agent, or Firm* — NSIP Law

(57) ABSTRACT

A system for a multi-computer control according to an exemplary embodiment may include: an integrated process server to receive, from one or more computer terminals, display information including video data and terminal identification information through a physical layer transceiver, multiplex and serialize the received display information, transmit the multiplexed and serialized display information to a user process terminal, and transmit a received user input signal to a corresponding computer terminal; and the user process terminal to mix the display information and the multi-control interface, display, on a display device, the execution screens of the activated computer terminals, and transmit the user input signal to the integrated process server along with corresponding terminal identification information, wherein the display information is received from the integrated process server, and the user input signal is received from an input device.

15 Claims, 6 Drawing Sheets

100

(51) Int. Cl.
*G06F 13/36* (2006.01)
*G06F 13/40* (2006.01)

(56) References Cited

U.S. PATENT DOCUMENTS

| | | | |
|---|---|---|---|
| 2002/0038257 A1* | 3/2002 | Joseph | G06Q 30/0635 705/26.81 |
| 2005/0267779 A1* | 12/2005 | Lee | G06Q 30/0601 709/226 |
| 2014/0244880 A1 | 8/2014 | Soffer | |

* cited by examiner

SYSTEM AND METHOD FOR MULTI-COMPUTER CONTROL

CROSS-REFERENCE TO RELATED APPLICATION(S)

This application claims the benefit under 35 U.S.C. § 119(a) of Korean Patent Application No. 10-2015-0006406, filed on Jan. 13, 2015, in the Korean Intellectual Property Office, the entire disclosure of which is incorporated herein by reference for all purposes.

BACKGROUND

1. Field

The following description relates to a computer control technology, and more specifically, to technology for the control extension of multiple computers.

2. Description of the Related Art

A multi-computer control to share and control two or more computers by using one display input device may be performed by using software through a network connection, or by using hardware, such as a keyboard, video and mouse (KVM). The multi-computer control by using software is to install virtual desktop software on each of the computer terminals that are connected in a network, access the network at a terminal where a screen is to be shown, receive display information from each computer terminal, and display the display information of another computer terminal. However, in such a case, there may be cases where the display may not be maintained due to the network speed, and there may be also a reduction in network performance of the system because a large part of the network bandwidth is used in display sharing. In addition, software for display sharing may act as a load on each of the computer terminals, thereby making a performance reduction. In particular, as the dissemination of a UHD display expands, which is over the range of Full HD (FHD), such problems may become bigger.

To prevent such a loss in performance, a server, etc., share a plurality of computers only by using one display and one input device through a KVM device consisting of hardware. The KVM device may prevent the performance reduction, which may occur when software is used, because the KVM is directly connected to each of the computer terminals. However, since the KVM is physically connected to only one computer terminal at a time. Thus, in a case of a task requiring many computers being used at the same time, the state of only the computer terminal being displayed at present may be checked, but the task progresses on other computer terminals may not be checked. In addition, such a task may reduce expandability, thereby making inconvenience. Korean Patent Application No. 10-2007-0079830 discloses a technology for increasing efficiency in a server management, but which does not solve the above-mentioned problems.

SUMMARY

The purpose of the present disclosure is to solve problems in performance degradation and a shortage of flexibility, which may occur when a plurality of computer terminals or systems access one display device, thereby providing a system and method for a multi-computer control to enable long-distance extension of the control at a low price.

In one general aspect, a system for a multi-computer control includes: an integrated process server to receive, from one or more computer terminals, display information including video data and terminal identification information through a physical layer transceiver, multiplex and serialize the received display information, transmit the multiplexed and serialized display information to a user process terminal, and transmit a received user input signal to a corresponding computer terminal; and the user process terminal to display, on a display device, the display information along with a multi-control interface, and transmit the user input signal to the integrated process server along with corresponding terminal identification information, wherein the display information is received from the integrated process server, and the user input signal is received from an input device.

The integrated process server may convert the received display information to an auxiliary (Aux) channel data format by using a USB-Aux converter. The integrated process server may be connected to the one or more computer terminals through DisplayPort. The integrated process server may multiplex the display information by assigning each different time slot according to a resolution or size of the video data. The integrated process server and the user process terminal may be connected to each other through an optical link according to a bandwidth of the display information and a distance therebetween.

The user process terminal may, prior to a transmission of the user input signal to the integrated process server, store the user input signal in a re-transmission buffer, and determine, based on a response signal received from the integrated process server, whether to re-transmit the stored user input signal. The integrated process server may, prior to a transmission of the display information to the user process terminal, store the display information in a re-transmission buffer, and determine, based on a response signal received from the user process terminal, whether to re-transmit the stored display information.

The user process terminal may in response to an activation signal being received through the multi-control interface, transmit, to the integrated process server, a hot plug signal of a computer terminal corresponding to the received activation signal, and the integrated process server may transmit the received hot plug signal to the corresponding computer terminal and receive the display signal. The user process terminal may simultaneously activate execution screens of two or more computer terminals and display the activated execution screens on the display device through the multi-control interface.

In another general aspect, a method for a multi-computer control by using an integrated process server and a user process terminal includes: receiving, at the integrated process server, display information including video data and terminal identification information; multiplexing and serializing, by the integrated process server, the received display information, and transmitting the multiplexed and serialized display information to the user process terminal; displaying, by the user process terminal, the display information and a multi-control interface on a display device, wherein the display information is received from the integrated process server; and transmitting, by the user process terminal, a user input signal to the integrated process server, which is then transmitted to a corresponding computer terminal, wherein the user input signal is received from an input device.

The receiving of the display information may include: receiving a user input signal at the user process terminal through the input device, wherein the user input signal includes a signal for activating execution screens of the one or more computer terminals; transmitting, to the integrated process server, a hot plug signal of a computer terminal corresponding to the activation signal; transmitting, by the integrated process server, the hot plug signal to the corresponding computer terminal; and receiving, at the integrated process server, the display information from the corresponding computer terminal.

The method may further include recovering a packet between the user process terminal and the integrated process server. The recovering of the packet may include: storing the user input signal in a re-transmission buffer, prior to a transmission of the user input signal from the user process terminal to the integrated process server; and determining, based on a response signal received from the integrated process server, whether to re-transmit the stored user input signal. The recovering of the packet may include: storing the display information in a re-transmission buffer, prior to a transmission of the display information from the integrated process server to the user process terminal; and determining, based on a response signal received from the user process terminal, whether to re-transmit the stored display information.

Other features and aspects may be apparent from the following detailed description, the drawings, and the claims.

Figure 1:
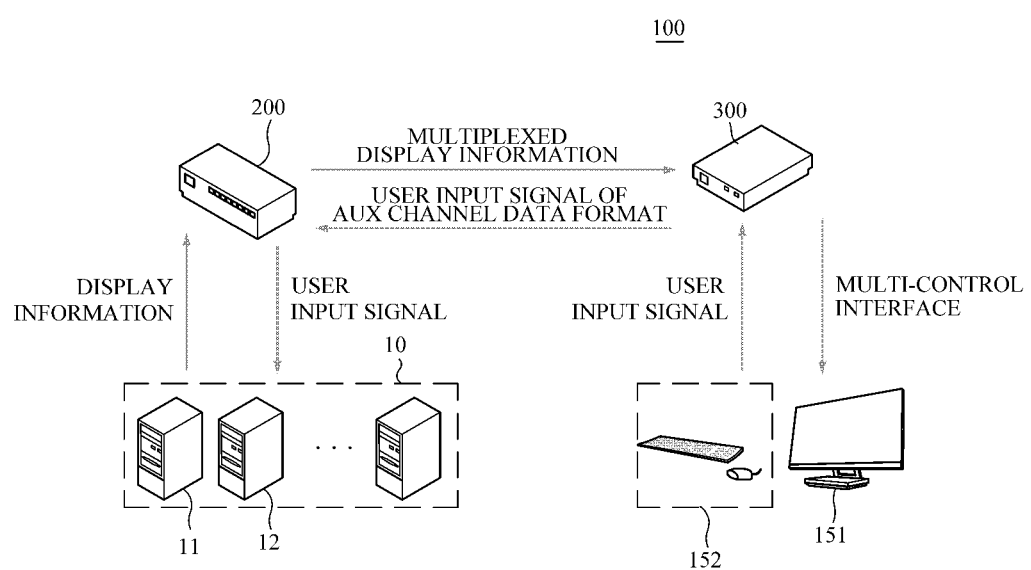
FIG. 1 is a diagram illustrating a system for a multi-computer control according to an exemplary embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 is a diagram illustrating a system for a multi-computer control according to an exemplary embodiment.

Referring to FIG. 1, a system 100 for a multi-computer control according to an exemplary embodiment may include an integrated process server 200 and a user process terminal 300.

The integrated process server 200 collects display information from each of the one or more computer terminals 10. The display information includes terminal identification information of each of the one or more computer terminals 10, and video data that corresponds to the terminal identification information (or to the computer terminal). The integrated process server 200 multiplexes each display information, which has been collected from the one or more terminal terminals 10, which is then transmitted to the user process terminal 300.

One or more computer terminals 10, connected to the integrated process server 200 in the system 100, transmit the display information to the integrated process server 200, including video data to be displayed on a screen. The integrated process server 200 may receive an input of the display information from the computer terminal 10 through a physical layer transceiver. It may be desirable that the physical layer transceiver, which connects the one or more computer terminals 10 and the integrated process server 200, uses DisplayPort that supports super-resolution. The integrated process server 200 may use each different communications interface according to display types. For an analog video graphics array (VGA), the communications interface may be a component that converts analog information to digital information by using an analog-to-digital converter (ADC); and for a digital visual interface (DVI), a high-definition multimedia interface (HDMI), and DisplayPort (DP), the communications interface may be a physical layer appropriate for each interface.

The integrated process server 200 transmits a hot plug detection signal to the one or more computer terminals 10. The hot plug signal displays a screen on a display device 151 by activating the computer terminal 10, and is transmitted from the user process terminal 300 to the integrated process server 200. Here, the integrated process server 200 may use a hot plug detection signal based on and corresponding to a multi-control interface of each computer terminal 10.

The integrated process server 200 multiplexes display information received from the computer terminal 10 and transmits the multiplexed display information to the user process terminal 300. The integrated process server 200 may multiplex the display information according to a resolution or size of video data included in the display information. Each of the one or more computer terminals 10 may have each different requirement for resolutions. For example, a first computer terminal 11 requires high-definition (HD) (1024×768) resolution, whereas a second computer terminal 12 requires quarter-high-definition (QHD) (2560×1440) resolution. In addition, since the required resolutions are different from each other, each size of the video data in the display information, received from the computer terminal 10, may be different. Thus, the integrated process server 200 may perform the multiplexing by assigning, to the large display information, more time slots that are to transmit data through weighted round robin (WRR) discipline.

The integrated process server 200 transmits the multiplexed display information to the user process terminal 300. A communications method between the integrated process server 200 and the user process terminal 300 may be determined according to a bandwidth of the display information and a distance therebetween. In a case where the display information requires a high bandwidth, or the integrated process server 200 is far away from the user process terminal 300, the integrated process server 200 and the user process terminal 300 may be connected to each other through an optical link. On the contrary, in a case where the display information requires a low bandwidth, or where the integrated process server 200 is close to the user process terminal 300, the integrated process server 200 and the user process terminal 300 may be connected to each other through copper wires.

The user process terminal 300 displays one or more screens corresponding to the one or more computer terminals 10 based on the display information, which has been received from the integrated process server 200. In addition, along with terminal identification information, the user process terminal 300 may transmit, to the integrated process server 200, a signal that corresponds to a user input for controlling the computer terminals 10 (hereinafter, referred to as 'user input signal'). The integrated process server 200 may receive the user input signal from the user process terminal 300. The user input signal received from the user process terminal 300 includes terminal identification information to identify each of the computer terminals 10. The integrated process server 200 may transmit the user input signal to the corresponding computer terminal 10 based on the terminal identification information.

The integrated process server 200 checks a computer terminal to be controlled, based on the terminal identification information that is included in the received user input signal. In addition, the integrated process server 200 converts the user input signal based on a connection method between the integrated process server 200 and the computer terminal, and transmits the converted user input signal to the computer terminal. In a case where the terminal identification information corresponds to the first computer terminal 11, and the integrated process server 200 is connected to the computer terminal through DisplayPort, the integrated process server 200 checks the first computer terminal 11 through the terminal identification information, and converts a format of the user input signal to an auxiliary (Aux) data format so as to correspond to the DisplayPort, and transmits the converted format to the first computer terminal 11 through the DisplayPort. The first computer terminal 11, which has received the user input signal from the integrated process server 200, may be controlled in response to the received user input signal.

When receiving, from the integrated process server 200, the display information including the video data and the terminal identification information, the user process terminal 300 transmits, to the integrated process server 200, an Ack packet that gives information that the display information has been successfully received, or a Nak packet that gives information that the display information has not been received.

The user process terminal 300 displays screens of the one or more computer terminals 10 on the display device 151, based on the multiplexed display information, which has been received from the integrated process server 200. The display information received from the integrated process server 200 may include video data of any one of the computer terminals 10 and its corresponding terminal identification information. The user process terminal 300 may de-multiplex the multiplexed display information. Then, based on the terminal identification information that is included in the display information, the user process terminal 300 displays, on the display device 151, screens for each of the computer terminals 10 and provides the multi-control interface of a GUI format to a user. To this end, the user process terminal 300 may include a minimum of OS, installed in program memory, to process GUI and USB information, so that the multi-control interface may be shown on the display device 151. It may be desirable that as the physical layer transceiver, which connects the user process terminal 300 and the display device 151, the DisplayPort for supporting super-resolution is used. In a case of other types of interfaces, such as VGA, HDMI, and DVI, a physical layer transceiver appropriate therefor may be used.

A user may be provided with execution screens of the one or more computer terminals 10 by the multi-control interface that is shown on the display device 151. The user may check the states and execution screens of a corresponding computer terminal 10 by using the one or more screens shown on the display device 151, and control each of the computer terminals 10 by using an input device 152. The input device 152 may be connected to the user process terminal 300 through USB in general. The input device 152 may include general input devices including a keyboard and a mouse, or various types of input devices, which are usable in general PCs, e.g., a touchpad.

The user process terminal 300 distinguishes and processes a type of the user input signal received from the input device 152. If the received user input signal is, for example, a window opening/closing or command shell manipulation, which are related to a multi-control interface shown on the display device 151, the user process terminal 300 processes and controls the multi-control interface in itself. On the contrary, if the received user input signal is related to one or more computer terminals 10, the user process terminal 300 transmits the user input signal to the integrated process server 200. The user process terminal 300 may convert, to an Aux channel signal, the user input signal, input through Universal Serial Bus (USB), by using a USB-Aux channel converter, etc., and transmits the Aux channel signal to the integrated process server 200. Also, in a case of DisplayPort, which can carry a user input signal on the Aux channel, the user process terminal 300 may transmit the user input signal to the integrated process server 200 without using an additional USB-Aux channel converter.

In addition, the user process terminal 300 may determine whether to display a multi-control interface based on hot plug information, which has been received from the display device 151. The user process terminal 300 may pass a hot plug signal through the integrated process server and transmit the hot plug signal to the corresponding computer terminal 10 so as to receive a display signal. The user process terminal 300 transmits the user input signal to the integrated process server 200, and then receives an Ack or Nak signal to determine whether the user input signal has been successfully received from the integrated process server 200. The user process terminal 300 may determine, based on the received Ack or Nak signal, whether a packet that includes the user input signal has been successfully transmitted.

Figure 2:
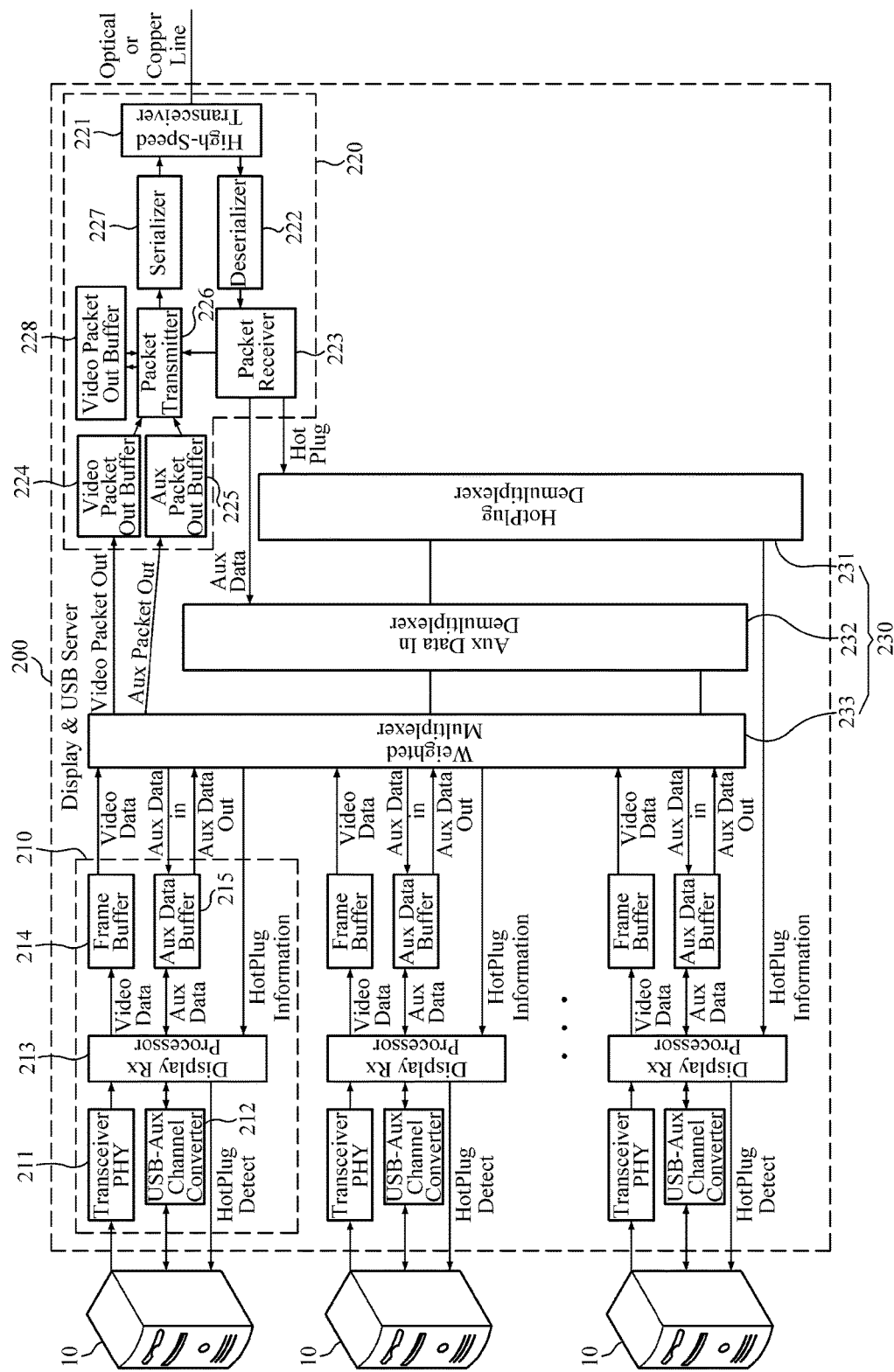
FIG. 2 is a diagram illustrating an integrated server according to an exemplary embodiment.

FIG. 2 is a diagram illustrating an integrated server according to an exemplary embodiment.

Referring to FIG. 2, an integrated process server 200 in a system 100 for a multi-computer control may include a manager 210 for one or more terminals (hereinafter, referred to as 'terminal manager'), a communications controller 220, and a multiplexer 230.

The terminal manager 210 receives display information corresponding to each computer terminal 10, and transmits a user input signal. The terminal manager 210 includes a physical layer transceiver (Transceiver PHY) 211, a USB-Aux channel converter 212, an RX processor 213, a frame buffer 214, and an Aux data buffer 215.

The communications controller 220 manages and controls communications between the integrated process server 200 and the user process terminal 300. The communications controller 220 includes a high-speed transceiver 221, a de-serializer 222, a packet receiver 223, a video packet output buffer 224, an Aux packet output buffer 225, a packet transceiver 226, a serializer 227, and a retransmission buffer 228.

The multiplexer 230 includes a hot plug de-multiplexer 231, an Aux multiplexer 232, and a weighted multiplexer 233.

The integrated process server 200 receives video data from a computer terminal 10 through the physical layer transceiver (transceiver PHY) 211. The transceiver PHY 211 may depend on a method for transmitting display information of a computer terminal 10. For example, for an analog VGA, the transceiver PHY 211 may be a component that converts the video data to digital information by using an AD converter, and for DVI, HDMI, and DisplayPort, may be a component corresponding to each interface.

A USB signal transmitted through a USB port of the computer terminal 10 may be converted to Aux channel data (Aux data) by a USB-Aux channel converter 212 of the integrated process server 200. If the computer terminal 10 is connected to the integrated process server 200 through DisplayPort (DP), which is one of multimedia interfaces for PC, a USB signal may be carried on an Aux channel of DisplayPort. Thus, in such a case, the Aux channel is used, instead of USB, so that the USB-Aux channel converter 212 may not be used. The Aux data transmitted from the computer terminal 10 includes terminal identification information of the corresponding computer terminal.

An Rx processor 213 stores video data in the frame buffer 214, which is transmitted from the computer terminal 10 to the transceiver PHY 211, and stores the Aux data in an Aux data buffer 215, which is converted by the USB-Aux channel converter 212 or transmitted through DisplayPort. In addition, the Rx processor 213 converts the stored video data and Aux data to a packet format through the weighted multiplexer 233. The one or more computer terminals 10, connected to a system 100 for a multi-computer control, have each different required resolution, resulting in each different size of data to be transmitted. Thus, the weighted multiplexer 233 may multiplex the video data not by using a general Round-robin algorithm, but by using a weighted round robin discipline that provides each different time slot according to each different size of the video data. In other words, the weighted multiplexer 233 assigns more time slots to be transmitted to large video data, which is then multiplexed.

The video data, multiplexed in the weighted multiplexer 233, is stored in a video packet output buffer 224, and the multiplexed Aux data is stored in an Aux packet output buffer 225. The stored video data and Aux data are transmitted from a packet transmitter 226 to a high-speed transceiver 221 through a serializer 227. The high-speed transceiver 221 transmits the display information including the video data and the Aux data, which is multiplexed as a packet format, to the user process terminal 300. A communications method between the high-speed transceiver 221 of the integrated process server 200 and the user process terminal 300 may be determined according to a bandwidth of the display information and a distance therebetween. In a case where the display information requires a high bandwidth, or the integrated process server 200 is far away from the user process terminal 300, the integrated process server 200 and the user process terminal 300 may be connected to each other through an optical link. On the contrary, in a case where the display information requires a low bandwidth, or where the integrated process server 200 is close to the user process terminal 300, the integrated process server 200 and the user process terminal 300 may be connected to each other through copper wires.

The user process terminal 300 transmits, to the integrated process server 200, a response signal that includes an Ack or Nak signal according to whether the multiplexed display information has been successfully received. The Ack signal is a response signal when the user process terminal 300 has successfully received the multiplexed display information, and the Nak signal is a response signal when the user process terminal 300 has not successfully received the multiplexed display information. The multiplexed display information, transmitted to the user process terminal 300 by the high-speed transceiver 221, is transmitted as a form including a plurality of packets. Thus, the user process terminal 300 transmits, to the integrated process server 200, a response signal corresponding to each packet of the received multiplexed display information. Then, the response signal received at the high-speed transceiver 221 may be transmitted to the packet receiver 223 through the de-serializer 222.

The high-speed transceiver 221 stores the multiplexed display information in a re-transmission buffer 228 in a process of transmitting, to the user process terminal 300, the multiplexed display information as a packet format. The packet receiver 223 determines whether to retransmit the multiplexed display information according to the received response signal. In a case where the received response signal includes an Ack signal, the packet receiver 223 deletes, from the re-transmission buffer 228, a packet of the multiplexed display information, related to a corresponding Ack signal, through the packet transmitter 226. In a case where the received response signal includes a Nak signal, the packet receiver 223 retransmits the multiplexed display information, which is related to a corresponding Nak signal, from the re-transmission buffer 228 to the user process terminal 300 through the packet transmitter 226.

The user input signal, transmitted from the user process terminal 300 to the high-speed transceiver 221, passes through the de-serializer 222 and reaches the packet receiver 223. Then, the user input signal reaching the packet receiver 223 passes through the Aux data de-multiplexer 232 and stores in the Aux data buffer 215 corresponding to the computer terminal 10 according to the terminal identification information. Then, the Rx processor 213 converts the user input signal stored in the Aux data buffer 215 to a USB signal through a USB-Aux channel converter 212, and transmits the USB signal to the computer terminal 10 corresponding to the terminal identification information.

If the packet of the user input is successfully received from the user process terminal 300, the packet transmitter 226 passes an Ack packet through the serializer 227 and transmits the Ack packet to the user process terminal 300 through the high-speed transceiver 221. On the contrary, if the packet of the user input is not successfully received from the user process terminal 300, the packet transmitter 226 passes an Nak packet through the serializer 227 and transmits the Nak packet to the user process terminal 300 through the high-speed transceiver 221. Then, if the packet receiver 223 receives a packet that overlaps with the previously received packet, the packet receiver 223 discards the overlapped packet.

Figure 3:
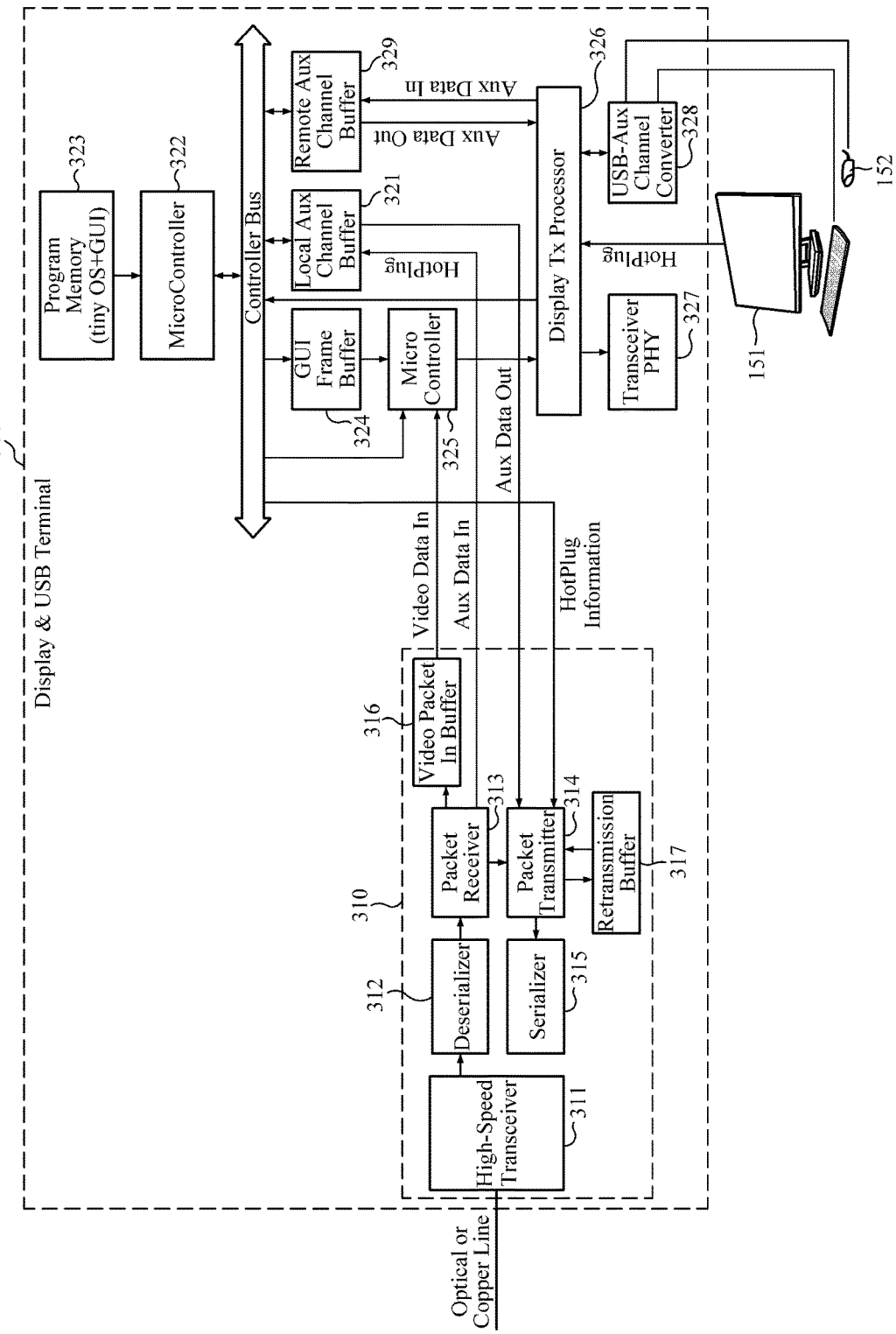
FIG. 3 is a diagram illustrating a user process terminal according to an exemplary embodiment.

FIG. 3 is a diagram illustrating a user process terminal according to an exemplary embodiment.

Referring to FIGS. 1 and 3, a user process terminal 300 includes a communications manager 310 and a central processor 320. The user process terminal 300 receives, as a packet format, multiplexed display information, which includes video data and Aux data (terminal identification information), from an integrated process server 200 through a communications manager 310. The packets of the multiplexed video data and the Aux data, received through a high-speed transceiver 311 of the communications manager 310 that is connected to an optical link or copper wires, pass through a de-serializer 312 and are transmitted to a packet receiver 313. Then, the packet receiver 313 transmits, to a packet transmitter 314, whether the multiplexed display information is successfully received. The packet transmitter 314 transmits a response signal to the integrated process server 200 based on whether the multiplexed display information has been successfully received, which is transmitted from the packet receiver 313. In a case where the packet has been successfully received, the packet transmitter 314 passes a response signal that includes an Ack packet through a serializer 315 and transmits the response signal to the integrated process server 200 through the high-speed transceiver 311. On the contrary, in a case where the packet has not been successfully received, the packet transmitter 314 passes the response signal, which includes the Nak packet, through the serializer 315 and transmits the response signal to the integrated process server 200 through the high-speed transceiver 311. Then, in a case where the packet receiver 313 receives a packet that overlaps with the previously received packet, the packet receiver 313 discards (or deletes) the overlapped packet.

The packet receiver 313 of the communications manager 310 divides the received multiplexed display information into a video data packet and an Aux data packet, stores the video data packet in a video packet reception buffer 316, and stores the Aux data packet in an Aux channel buffer 321.

The user process terminal 300 includes a microcontroller 322, and includes a program memory 323, in which an embedded tiny OS and a graphic user interface (GUI) are installed. The embedded tiny OS refers to a minimum of OS that can process a user input signal, which is USB information, and a minimum of OS that can process a multi-control interface.

The microcontroller 322 stores a multi-control interface in a GUI frame buffer 324. In addition, the microcontroller 322 mixes a GUI stored in a GUI frame buffer 324, and video data stored in a video packet reception buffer 316 by using a mixer, so as to generate data to be shown on a display device 151. The microcontroller 322 transmits, to a mixer 325, video data information and resolution information of each divided screen which are to be activated on the display device 151 through a controller bus, and converts a resolution of the video data received at the mixer 325. The mixer 325 mixes the video data and the GUI, thereby generating a multi-control interface, which is mixed display data.

The multi-control interface, i.e., the display data mixed at the mixer 325, is transmitted to a transceiver PHY 327 through a Tx processor 326 of the communications manager 310. The transceiver PHY 327 transmits the multi-control interface to the display device 151, which is then provided to a user. The transceiver PHY 327 may transmit the multi-control interface to the display device 151 by using DisplayPort that supports a super-resolution, and transmit the multi-control interface to the display device 151 by using various types of interfaces, such as VGA, HDMI, and DVI. In such a case, the transceiver PHY 327 may have a communications form.

A user may be provided with execution screens of one or more computer terminals 10 by the multi-control interface that is shown on the display device 151. The user may check the states and execution screens of a corresponding computer terminal 10 by using the one or more screens shown on the display device 151, and control each of the computer terminals 10 by using an input device 152. The input device 152 may be connected to the user process terminal 300 through USB in general.

The user input signal, transmitted to the user process terminal 300 through the input device 152, may be converted to an Aux data format by a USB-Aux channel converter 328, which is then transmitted to the Tx processor 326. If the user process terminal 300 is connected to the input device 152 through DisplayPort, USB data may be carried on an Aux channel of DisplayPort, thus a conversion process at the USB-Aux channel converter 328 being omitted.

The user input signal, which is of an Aux data format and transmitted to the Tx processor 326, is transmitted to the microcontroller 322 through a remote Aux channel buffer 329. The microcontroller 322 distinguishes types of the received user input signal. The user input signal received from the input device 152 may be a signal for controlling each computer terminal 10, or be a control signal for the multi-control interface. For example, if the received user input signal is related to the multi-control interface shown on the display device 151, the microcontroller 322 uses a user input signal, e.g., window opening/closing and command shell manipulations, as a signal for controlling the inside of the user process terminal 300. On the contrary, if the received user input signal is a signal (which is required inside of each window) for controlling each computer terminal 10, the microcontroller 322 transmits the user input signal to the Aux channel buffer 321, and the packet transmitter 314 transmits the user input signal to the high-speed transceiver 311 through the serializer 315, which is then transmitted to the integrated process server 200.

The user process terminal 300 receives hot plug information from a display device 151. The Tx processor 326 of the central processor 320 transmits the received hot plug information to the microcontroller 322 by using a controller bus. The microcontroller 322 may determine whether to show a GUI (a multi-control interface) on the display device 151, by using the received hot plug information. If a screen (window) corresponding to each computer terminal 10 is activated on the multi-control interface, which is shown on the display device 151, the microcontroller 322 may receive the hot plug information corresponding to the activated computer terminal 10. The microcontroller 322 transmits the hot plug information corresponding to the computer terminal 10, which is activated on the multi-control interface, to the integrated process server 200 through the packet transmitter 314 and the high-speed transceiver 311. The integrated process server 200 transmits the hot plug information to the corresponding computer terminal 10, receives display information from the corresponding computer terminal 10, and transmits the received display information to the user process terminal 300, thereby activating a screen of the corresponding computer terminal 10 on the multi-control interface.

The integrated process server 200 transmits a response signal according to whether data has been successfully received from the user process terminal 300. In a case where the data has been successfully transmitted, the response signal includes an Ack signal; and in a case where the data has not been successfully transmitted, the response signal includes an Nak signal. If the response signal is received from the integrated process server 200 to the high-speed transceiver 311 of the user process terminal 30, the received response signal reaches the packet receiver 313 through the de-serializer 312. In a case where a packet (data) has been successfully transmitted, the Ack signal is received; and in a case where there has been a problem in the packet, the Nak signal is received. The packet transmitter 314 stores, in a re-transmission buffer 317, data which is transmitted in a process of transmitting a user input signal and a hot plug signal to the integrated process server 200. The packet transmitter 314 transmits data, stored in the re-transmission buffer 317, according to the response signal received from the integrated process server 200. If an Nak signal is received from the integrated process server 200, the packet transmitter 314 may re-transmit the packet, which corresponds to the Nak signal, among the packets (data) stored in the re-transmission buffer 217. On the contrary, if an Ack signal is received from the integrated process server 200, packet transmitter 314 may delete the packet, which corresponds to the Ack signal, from the packets stored in the re-transmission buffer 217. In addition, the packet transmitter 214 transmits the packet to the integrated process server 200, and then if there is no response signal being received within a predetermined period of time, the packet transmitter 214 re-transmits the corresponding packet, stored in the re-transmission buffer 217, to the integrated process server 200.

Figure 4:
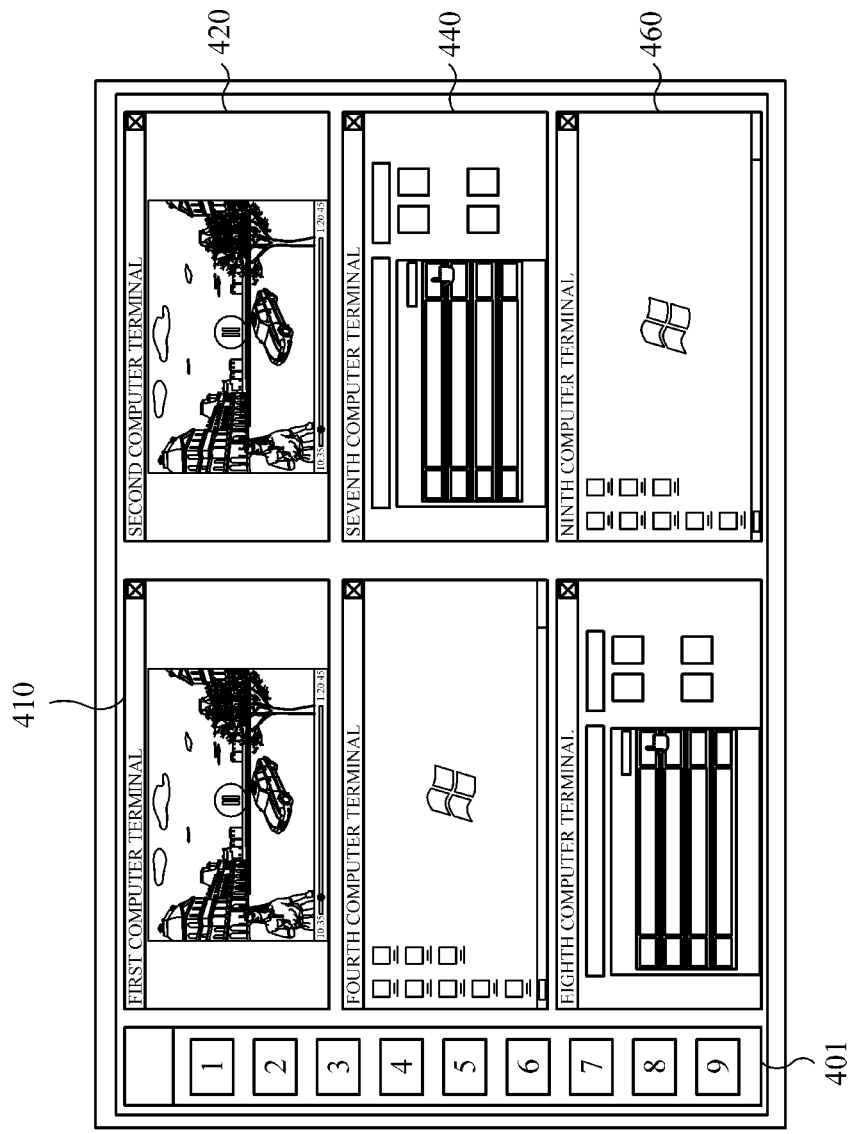
FIG. 4 is a diagram illustrating an example of a multi-control interface according to an exemplary embodiment.

FIG. 4 is a diagram illustrating an example of a multi-control interface according to an exemplary embodiment.

Referring to FIGS. 1 and 4, a multi-control interface shown on a display device 151 may display execution screens of computer terminals, which a user has activated, among one or more computer terminals 10. In an exemplary embodiment of FIG. 4, it is assumed that first to ninth computer terminals, which are nine in total, are connected to a system 100 for a multi-computer control.

The user process terminal 300 displays a multi-control interface 400 on a display device 151. A user may check and control running states of the multiple computer terminals 10 through the multi-control interface 400. The user may control the multi-control interface 400 by using an input device 152, such as a keyboard and a mouth. If the user activates first, second, fourth, seventh, eighth, and ninth computers on a computer terminal list 401 by using the input device 152, a user input signal corresponding thereto is transmitted to the user process terminal 300, and hot plug information (a hot plug signal) corresponding to the activated computer terminals is transmitted from the user process terminal 300 to the integrated process server 200.

The integrated process server 200 transmits the received hot plug information to a corresponding computer terminal (which is activated on the multi-control interface), and receives, from the computer terminal, display information that includes video data and terminal identification information. Then, the integrated process server 200 multiplexes the video data and the terminal identification information, received from each of the computer terminals, which are then transmitted to the user process terminal 300. The user process terminal 300 serializes the received video data and mixes the video data with a GUI, which is then displayed on the multi-control interface 400.

The user may check running states of the computer terminals through execution screens 410, 420, 430, 440, 450, and 460 thereof, which are shown on the multi-control interface 400.

The user may select the execution screen of the computer terminal by using an input device 152, and control the computer terminal corresponding to the selected execution screen. For example, if the user selects the execution screen 440 of the seventh computer terminal by using the input device 152, and performs word-processing tasks by using a keyboard as the input device 152, the user input signal, input by the input device 152, is transmitted to the user process terminal 300. In general, the input device 152 may be connected to the user process terminal 300 through USB, but examples thereof are not limited thereto.

If the user input signal is received from the input device 152, the user process terminal 300 converts the received user input signal to an Aux data format, and distinguishes a type of the received user input signal. The user input signal may be a signal for controlling the corresponding computer terminal or the multi-control interface. The user process terminal 300 recognizes that the received user input signal is a control signal, which is received through the execution screen 440 of the seventh computer terminal, and serializes the received user input signal, which is then transmitted to the integrated process server 200 through a high-speed transceiver. In such a process, the user process terminal 300 may add, to the user input signal, identification information of the computer terminal, which corresponds to the received user input signal, which is then transmitted. In an exemplary embodiment of FIG. 4, the terminal identification information corresponding to the seventh computer terminal may be added to the user input signal.

The integrated process server 200 de-serializes and de-multiplexes the received user input signal, and transmits the de-serialized and de-multiplexed user input signal to the computer terminal (the seventh computer terminal) corresponding to the terminal identification information. In a case of DisplayPort, the integrated process server 200 may transmit the user input signal, which is of an Aux data format, directly to the seventh computer terminal; and in a case of USB, the integrated process server 200 may convert the user input signal to a USB signal and transmit the USB signal to the seventh computer terminal.

The user may activate the execution screens of the computer terminals included in the computer terminal list 401, as well as the seventh computer terminal, thereby checking the running states of all the computer terminals, which are connected to a system, through the execution screens 410, 420, 430, 440, 450, and 460 of the computer terminal, and controlling each of the computer terminals by using the input device 152. In FIG. 4, specific processes inside the user process terminal 300 and the integrated process server 200 are the same as FIGS. 2 and 3 which are specifically described above.

Figure 5:
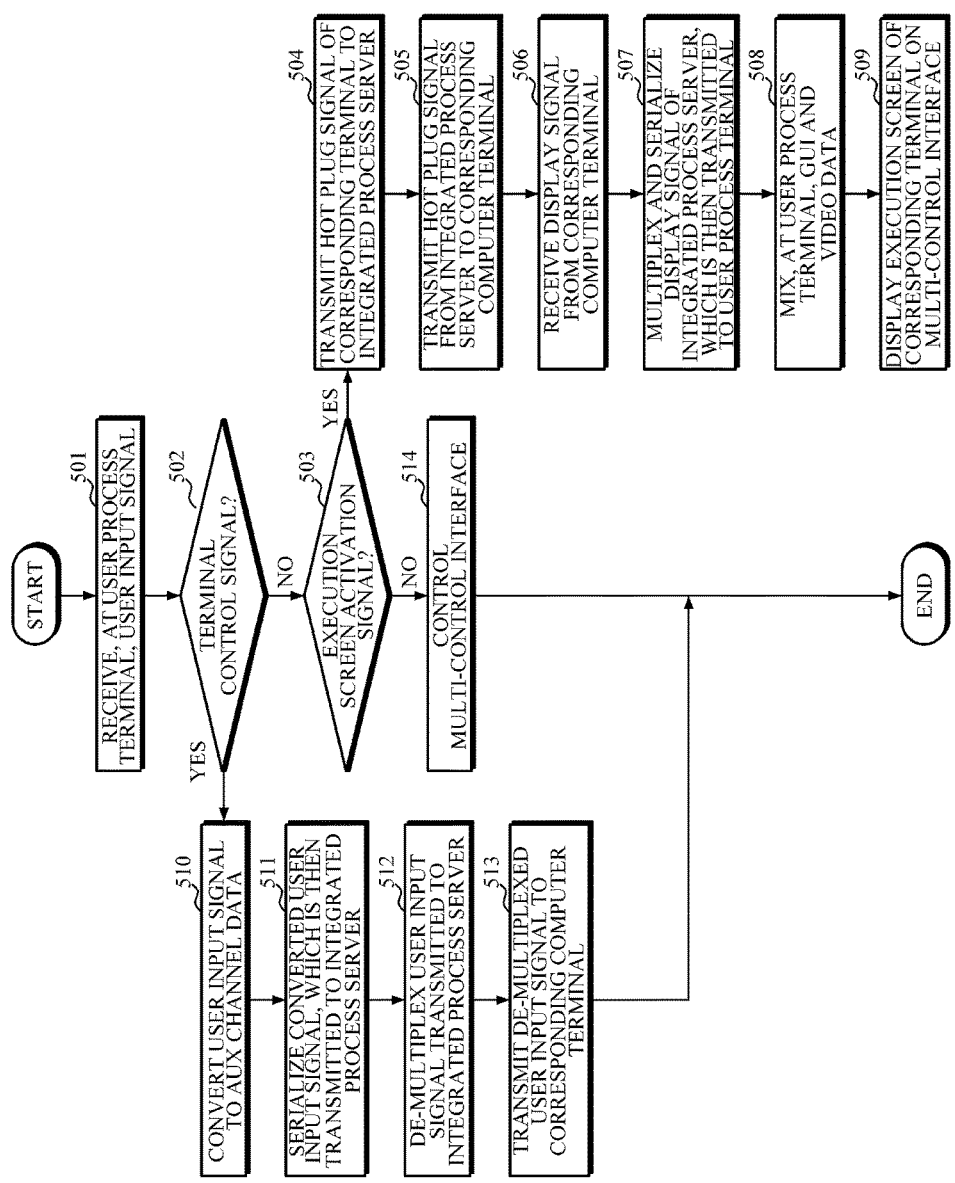
FIG. 5 is a flow chart illustrating a method for a multi-computer control according to an exemplary embodiment.

FIG. 5 is a flow chart illustrating a method for a multi-computer control according to an exemplary embodiment.

Referring to FIG. 5, a method for a multi-computer control according to an exemplary embodiment is as follows. First, a user process terminal receives a user input signal in 501. The user input signal, input to the user process terminal by an input device, may be a signal for controlling operations of a multi-control interface that is shown on a display device, or may be a signal for controlling computer terminals that are connected to a system (hereinafter, referred to as 'terminal control signal'). Thus, the user process terminal determines whether the received user input signal is the terminal control signal in 502.

If the received user input signal is not the terminal control signal, the user process terminal determines whether the received user input signal is a signal for activating an execution screen (hereinafter referred to as 'activation signal') in 503. If the received user input signal is not a signal for directly controlling a computer terminal, the user process terminal determines the received user input signal as being related to operations of the multi-control interface, and then checks whether the received user input signal is the activation signal. A user may activate an execution screen of a required computer terminal by controlling the multi-control interface by using an input device. If the received user input signal is not the activation signal, but the signal for controlling the multi-control interface, the user process terminal controls the multi-control interface based on the user input signal in 514.

If the received user input signal is the signal for activating the execution screen of a predetermined computer terminal, the user process terminal transmits a hot plug signal related to a corresponding computer terminal to an integrated process server in 504. Then, the integrated process server transmits the received hot plug signal to the corresponding computer terminal in 505, and receives a display signal from the corresponding computer terminal in 506. If the integrated process server transmits the hot plug signal to the corresponding computer terminal, the computer terminal transmits, to the integrated process server, display information which includes video data and terminal identification information related to the execution screen. The integrated process server may receive an input of the display information from the corresponding computer terminal through a transceiver PHY. It may be desirable that the transceiver PHY, which connects the one or more computer terminals and the integrated process server, uses DisplayPort that support a super-resolution. The integrated process server may use each different communications interface according to display types. For an analog video graphics array (VGA), the communications interface may be a component that converts analog information to digital information by using an analog-to-digital converter (ADC); and for a digital visual interface (DVI), a high-definition multimedia interface (HDMI), and DisplayPort (DP), the communications interface may be a physical layer appropriate for each interface.

Then, the integrated process server multiplexes and serializes the received display signal, which is then transmitted to the user process terminal in 507. In such a process, each of the one or more computer terminals may have each different requirement for resolutions, which results in a different size of video data of the display information received from the computer terminal. Thus, the integrated process server may perform the multiplexing by assigning, to the large display information, more time slots that are to transmit data through weighted round robin (WRR) discipline. In addition, a communications method between the integrated process server and the user process terminal may be determined according to a bandwidth of the display information and a distance therebetween. In a case where the display information requires a high bandwidth, or the integrated process server is far away from the user process terminal, the integrated process server and the user process terminal may be connected to each other through an optical link. On the contrary, in a case where the display information requires a low bandwidth, or the integrated process server is close to the user process terminal, the integrated process server and the user process terminal may be connected to each other through copper wires.

The user process terminal, which receives the multiplexed display signal from the integrated process server, serializes the received display signal and mixes the video data, included in the display signal, with a GUI in 508. The user process terminal mixes the stored GUI and the video data included in the display information, and configures the multi-control interface to be shown on the display device. In addition, the user process terminal displays execution screens of computer terminals, which a user has activated, on the multi-control interface of the display device in 509.

In 502, if the received user input signal is the terminal control signal, the user process terminal converts the user input signal to Aux channel data in 510. In general, the input signal transmitting the user input signal is connected to the user process terminal through USB. Thus, the user process terminal converts the user input signal, input through USB, to an Aux channel signal by using a USB-Aux channel converter, etc. Then, the user process terminal serializes the user input signal, converted to an Aux data format, and transmits the serialized user input signal to the integrated process server in 511. If the user input signal is received from the user process terminal, the integrated process server de-multiplexes the received user input signal in 512, and transmits the de-multiplexed user input signal to a corresponding computer terminal in 513. In such a process, the integrated process server converts the user input signal to a USB signal according to the need, which is then transmitted. The received user input signal has an Aux channel data (Aux data) format through operation 510. If the integrated process server and the computer terminal are connected to each other through DisplayPort, which can transmit Aux data, the user input signal may be transmitted to the computer terminal without the conversion. On the contrary, in a case of a connection, in which the Aux data cannot be transmitted, e.g. USB, the data format is converted to a USB signal and transmitted to the computer terminal. The corresponding computer terminal operates corresponding to the received user input signal, and displays the execution screens on the multi-control interface of the display device through the integrated process server and the user process terminal.

Figure 6:
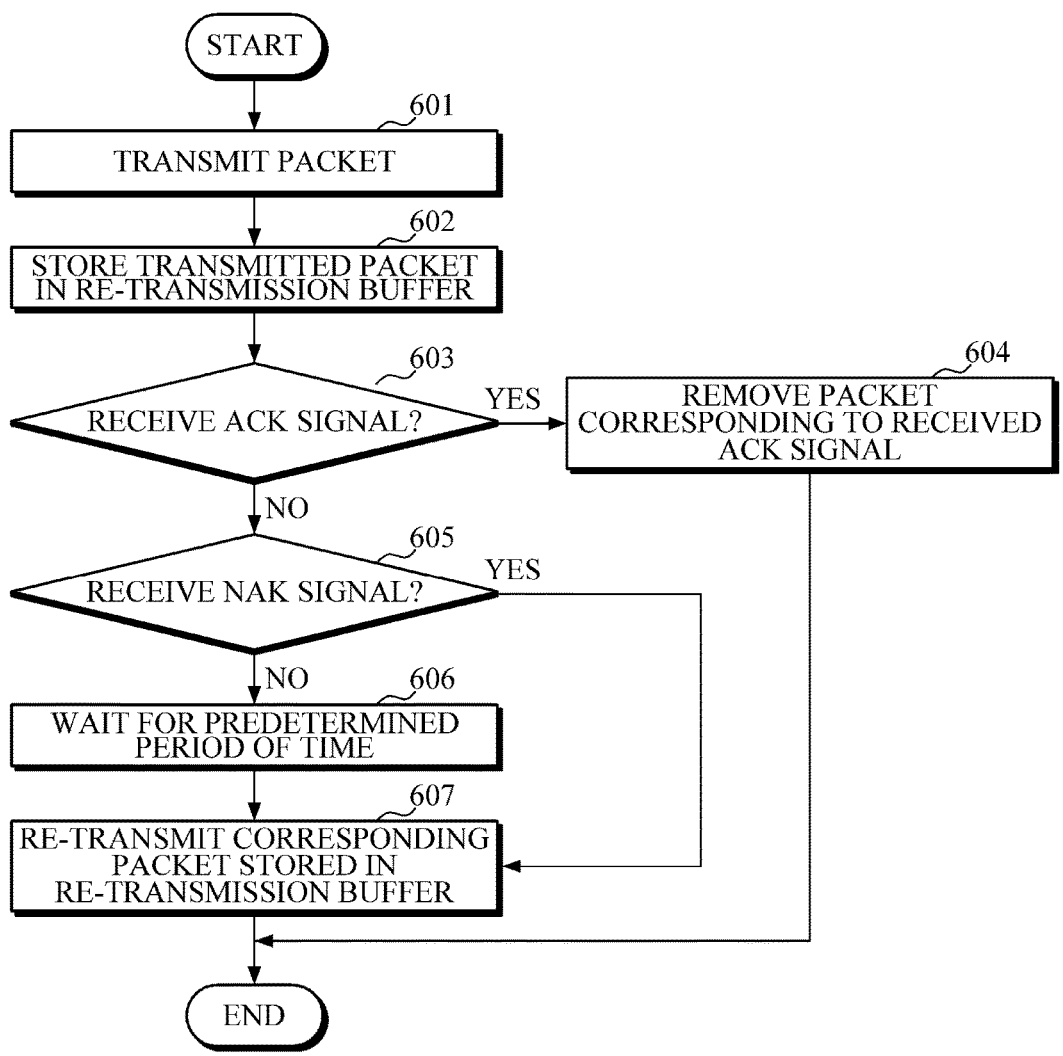
FIG. 6 is a flow chart illustrating a packet recovery method depending on a response signal according to an exemplary embodiment.

FIG. 6 is a flow chart illustrating a packet recovery method depending on a response signal according to an exemplary embodiment.

Referring to FIG. 6, a system for a multi-computer control according to an exemplary embodiment may recover a packet loss, which occurs in a process of transmitting a packet (data) between an integrated process server and a user process terminal.

First, a packet is transmitted between the integrated process server and the user process terminal in 601. In the system for a multi-computer control, the integrated process server transmits, to the user process terminal, display information which includes video data and terminal identification information. Then, the user process terminal transmits the user input signal to the integrated process server. The transmission or reception data between the integrated process server and the user process terminal, as specifically described above, is transmitted as a packet format through the multiplexing and serialization. While transmitting the packet, the integrated process server and the user process terminal store the transmitted packet in a re-transmission buffer in 602.

Then, the integrated process server and the user process terminal determine whether an Ack signal is included in a response signal which has been received from the other side in 603. If the packet has been successfully transmitted, a receiving side replies by having the Ack signal included in the response signal. On the contrary, if the packet has not been successfully transmitted, the receiving side replies by having an Nak signal included in the response signal. If the Ack signal is received, the integrated process server and the user process terminal determine the packet as being successfully transmitted, and delete the packet corresponding to the received Ack signal in 604.

If the Ack signal is not received in 603, the integrated process server and the user process terminal determine whether the Nak signal is included in the received response signal in 605. If the Nak signal is not received, the integrated process server and the user process terminal waits for a predetermined period of time in 606. If the response signal is not received even after the predetermined period of time, the integrated process server and the user process terminal determine that there has been a problem in the packet transmission, and re-transmit the corresponding packet that is stored in the re-transmission buffer in 607. Also, if it is determined that the Nak signal has been included in the received response signal in 605, the integrated process server and the user process terminal determines that there has been a problem in the packet transmission, and re-transmit the corresponding packet that is stored in the re-transmission buffer.

A system and method for a multi-computer control according to an exemplary embodiment may display execution screens of a plurality of computers on one high-resolution display device, and may expand more the pre-existing display which can show a maximum of four screens at the same time. Without an additional software installation for display information transmission, the system and method may directly receive display information and may not lay burdens on computer resources. Also, the system and method may conveniently control the plurality of computers the same as controlling one computer, only by using one display device and one input device.

Moreover, the system and method performs a broadband transmission using an optical wire or copper wires, thereby displaying a high-resolution screen and expanding the range. Furthermore, a user transmits a hot plug signal regarding activated execution screens and selectively operates computers that correspond thereto, thereby reducing the power for unnecessary computers and resources for the display, as well.

The methods and/or operations described above may be recorded, stored, or fixed in one or more non-transitory computer-readable storage media that includes program instructions to be implemented by a computer to cause a processor to execute or perform the program instructions. The media may also include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A system for multi-computer control, comprising:
    a user process terminal; and
    an integrated process server configured to receive, from computer terminals, display information comprising video data and terminal identification information through a physical layer transceiver, multiplex and serialize the received display information, transmit the multiplexed and serialized display information to the user process terminal, and transmit a received user input signal to a corresponding computer terminal among the computer terminals,
    wherein the user process terminal is configured to
        display, on a display device, the display information along with a multi-control interface, and transmit the user input signal to the integrated process server along with corresponding terminal identification information, wherein the display information is received from the integrated process server, and the user input signal is received from an input device, and
        in response to an activation signal being received through the multi-control interface, transmit a hot plug signal of the corresponding computer terminal which corresponds to the received activation signal to the integrated process server,
    wherein the integrated process server is further configured to transmit the received hot plug signal to the corresponding computer terminal, and to receive a display signal, and
    wherein the user process terminal is further configured to simultaneously activate execution screens of two or more of the computer terminals, and to display the activated execution screens on the display device through the multi-control interface.

2. The system of claim 1, wherein the integrated process server is further configured to convert the received display information to an auxiliary (Aux) channel data format.

3. The system of claim 1, wherein the integrated process server is further configured to be connected to the computer terminals through DisplayPort.

4. The system of claim 1, wherein the integrated process server is further configured to multiplex the display information by assigning each different time slot according to a resolution of the video data or a size of the video data.

5. The system of claim 1, wherein the integrated process server and the user process terminal are further configured to be connected to each other through an optical link according to a bandwidth of the display information and a distance between the integrated process server and the user process terminal.

6. The system of claim 1, wherein the user process terminal is further configured to convert the received user input signal to an Aux channel data format.

7. The system of claim 1, wherein the user process terminal is further configured to, prior to a transmission of the user input signal to the integrated process server, store the user input signal in a re-transmission buffer, and determine, based on a response signal received from the integrated process server, whether to re-transmit the stored user input signal.

8. The system of claim 1, wherein the integrated process server is further configured to, prior to a transmission of the display information to the user process terminal, store the display information in a re-transmission buffer, and determine, based on a response signal received from the user process terminal, whether to re-transmit the stored display information.

9. A method of computer control, the method comprising:
    receiving, at an integrated process server, display information comprising video data and terminal identification information;

multiplexing and serializing, by the integrated process server, the received display information, and transmitting the multiplexed and serialized display information to a user process terminal;

displaying, by the user process terminal, the display information and a multi-control interface on a display device, wherein the display information is received from the integrated process server; and transmitting, by the user process terminal, a user input signal to the integrated process server, which is transmitted to a computer terminal, wherein the user input signal is received from an input device, wherein the receiving of the display information comprises receiving the user input signal at the user process terminal through the input device, transmitting, to the integrated process server, a hot plug signal of the computer terminal which corresponds to the activation signal, transmitting, by the integrated process server, the hot plug signal to the computer terminal, and receiving, at the integrated process server, the display information from the computer terminal, and wherein the user input signal comprises a signal to activate an execution screen of the computer terminal.

10. The method of claim 9, further comprising converting the received display information to an auxiliary (Aux) channel data format.

11. The method of claim 9, wherein the integrated process server is configured to multiplex the display information by assigning each different time slot according to a resolution of the video data or a size of the video data.

12. The method of claim 9, wherein the integrated process server and the user process terminal are configured to be connected to each other through an optical link according to a bandwidth of the display information and a distance between the integrated process server and the user process terminal.

13. The method of claim 9, further comprising recovering a packet between the user process terminal and the integrated process server.

14. The method of claim 13, wherein the recovering of the packet comprises storing the user input signal in a re-transmission buffer, prior to a transmission of the user input signal from the user process terminal to the integrated process server, and determining, based on a response signal received from the integrated process server, whether to re-transmit the stored user input signal.

15. The method of claim 13, wherein the recovering of the packet comprises storing the display information in a re-transmission buffer, prior to a transmission of the display information from the integrated process server to the user process terminal, and determining, based on a response signal received from the user process terminal, whether to re-transmit the stored display information.

\* \* \* \* \*